United States Patent [19]
Yang

[11] Patent Number: 5,469,160
[45] Date of Patent: Nov. 21, 1995

[54] COMPUTER KEYBOARD

[76] Inventor: Suimin Yang, 2 Political Affairs Teaching & Research Navy Political Affairs Institute, Dalian City, Liaoning Prov., China, 116001

[21] Appl. No.: 78,087

[22] Filed: Jun. 18, 1993

[30] Foreign Application Priority Data

Jun. 18, 1992 [CN] China .................. 92216253.0

[51] Int. Cl.$^6$ .................................................. H03K 17/94
[52] U.S. Cl. ........................... 341/22; 341/20; 345/168; 400/488; 400/489
[58] Field of Search .................. 341/22, 20; 364/708.1, 364/709.01, 709.12; 345/168; 400/488, 489

[56] References Cited

U.S. PATENT DOCUMENTS

| | | | |
|---|---|---|---|
| 4,509,873 | 4/1985 | Ryan | 341/22 |
| 5,119,078 | 6/1992 | Grant | 341/22 |
| 5,122,786 | 6/1992 | Rader | 341/22 |
| 5,161,760 | 11/1992 | Terbrack | 345/168 |
| 5,228,791 | 7/1993 | Fort | 400/489 |
| 5,311,210 | 5/1994 | O'Brien et al. | 345/167 |

*Primary Examiner*—John K. Peng
*Assistant Examiner*—Daniel J. Wu
*Attorney, Agent, or Firm*—Jacobson, Price, Holman & Stern

[57] ABSTRACT

The present invention relates to a keyboard apparatus for electronic computers. In order to improve the work efficiency and lighten the weariness of an operator, the basic keys in common use consisting of 26 English letter keys and some of punctuation mark keys arranged in three rows are located on different surfaces. ZXCVBNM,./keys are located on the surface having a right angle with the main surface of the keyboard with the back of the keys towards the operator; ASDFGHJKL; keys are located on the lowermost surface; thus the upper surface of ASDFGHJKL; keys are lower than those of any other keys.

9 Claims, 2 Drawing Sheets

COMPUTER KEYBOARD

FIELD OF THE INVENTION

The present invention relates to a computer keyboard, relates more in particular to a keyboard apparatus for electronic computers, word-processors, as well as English typewriters.

BACKGROUND

The keys on a computer keyboard may be divided into basic keys and functional keys which are generally fitted on a plate. A keyboard with keys on a slope has the following disadvantages: Firstly, the action extent of the hands and arms is large when an operator works with the keyboard, and the operator will soon be fatigued with operation due to suspension of his/her wrists; secondly, only downward pressing is performed by an operator in operating a keyboard, this is disadvantageous to the memory of brain, which makes one difficult to quickly remember the exact position of the keys, as well as difficult to sufficiently exploit the potentiality of the nimbleness of the operator's fingers, and difficult to achieve blind-typing, i.e. typing without looking at the keyboard.

The keyboard is mostly used as an input device for computers, the design of a conventional English keyboard continues to use the arrangement of the QWERTY mechanical English typewriter. Many researches reveal that, from the point of view of work efficiency theory, such design of arrangement can be further improved. To improve the efficiency of inputting English with keyboard, many technical solutions of the keyboard have been put forward. The principles of man-machine efficiency theory have been taken into full consideration for keyboard improvement. In comparison with conventional keyboards, some of the improved keyboards are more adaptable to the characteristics of an operator, and exhibit significantly, increased input efficiency in laboratory experiments. These improved keyboards, however, are difficult to be popularized in practice. The main reason is that these improvements are made in the basic arrangement of keys of a conventional keyboard which has become familiar in use by generations of users who therefore prefer not to use a keyboard with a new arrangement of the keys, and furthermore, to make such improvement, the manufacturers would take a risk.

SUMMARY OF THE INVENTION

Figure 1:
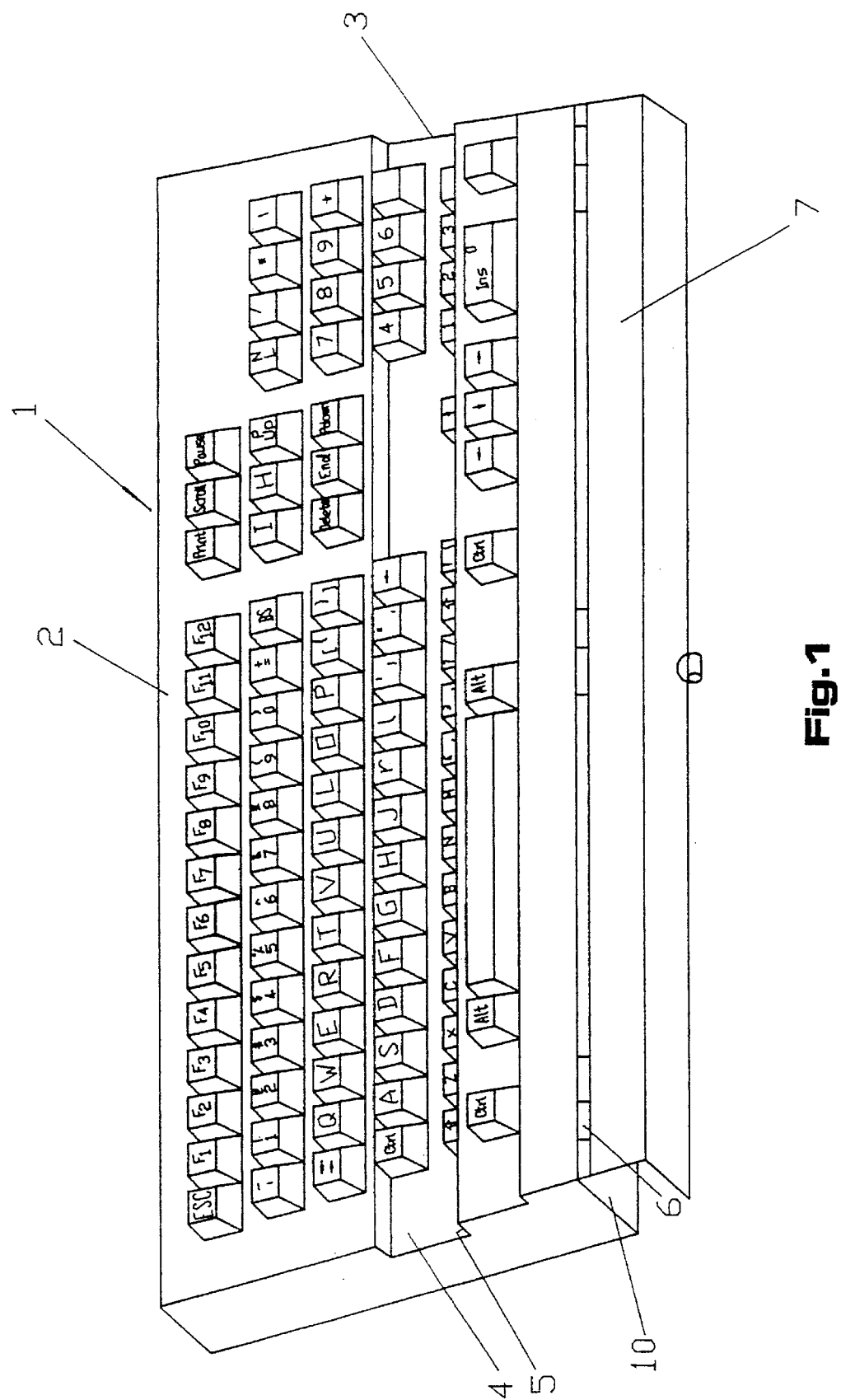
FIG. 1 is a schematic perspective view of the top, left side and front of a computer keyboard.

An objective of the present invention is to provide a common computer keyboard with the keys thereof distributed on different surfaces without changing the arrangement of the conventional keys.

Another objective of the present invention is to provide a keyboard which, during use, the fingers of an operator can perform both downward and backward pressing in order that the potentiality of the nimbleness of fingers can be exploited. Also a beginner can more quickly remember the position of the keys.

Another objective of the present invention is to provide a computer keyboard which make it possible to reduce the extent of action of the hands and arms of an operator, so as to save labor, expended by the operator, Another objective of the present invention is to provide a computer keyboard with each of the columns of basic keys in common use (i.e. 26 English letter keys and some of the punctuation mark keys) paralleling to the left and right edges of the keyboard.

A further objective of the present invention is to provide a computer keyboard with a platform for supporting the wrists of an operator.

A still further objective of the present invention is to provide a computer keyboard which may overcome the drawbacks of the above-mentioned prior art in the field of keyboard.

The present invention details provides for a computer keyboard which comprises basic keys in common use and functional keys, wherein the keys on the keyboard are distributed on two or more surfaces.

The angles between at least one pair of the surfaces therein in is not equal to zero, particularly, it is a preferred arrangement that the angle between at least one pair of said surfaces on which the basic keys in common use are fitted is a right one.

A preferred scheme of the structure of keyboard is to provide a groove in the keyboard surface, the basic keys in common use are distributed on the bottom and front wall of the groove and the main surface of the keyboard, and the functional keys are distributed on the main surface of the keyboard. A preferred embodiment of the present invention is to arrange the row of keys ASDFGHJKL; (hereinafter referred to as ASDFG or second row of basic keys in common use) on the lowermost surface of the keyboard, i.e. at the bottom of the groove; the row of keys ZXCVBNM,./ (hereinafter referred to as ZXCVB or first row of basic keys in common use) on the front wall of the groove with the back of ZXCVB keys towards the operator; the row of keys QWERTYUIOP (hereinafter referred to as QWERT or third row of basic keys in common use) on the main surface of the keyboard.

Another preferred embodiment of the present invention is to arrange the row of basic keys in common use ZXCVB on a surface at right angle with the main surface of the keyboard and with the back of those keys towards the operator, and rows of basic keys in common use QWERT and ASDFG on the main surface of the keyboard with the upper surfaces of the row of keys QWERT higher than those of the keys ASDFG.

In order that the fingers of an operator can conveniently play both downward pressing and backward pressing, each of the columns of basic keys in common use is arranged in parallel with the left and right edges of the keyboard.

To save the labor paid by an operator, a platform can be provided at the front edge of the keyboard to support the wrists of the operator. For portable computers word processors, or typewriters, it is preferred to provide a platform hinged to the front edge of the keyboard to facilitate portability after being folded.

The advantages of the present invention are as follows:

1. In order to make the improved keyboard and the conventional keyboard consistent in use, no fundamental change on the arrangement of the basic keys in common use has been made in the keyboard according to the present invention.

2. All the rows of keys of a conventional keyboard are located on the same surface, such that inputting each English letter includes both moving and stricking action of the finger. In order to achieve high speed blind typing during inputting, the action of fingers should be reduced as much as possible during input operation. Thus, the first row of basic keys in common use (i.e., the row of keys ZXCVB) of the keyboard according to the present invention is positioned in a plane (surface) at right angles with the main surface of the keyboard, thereby, the movement of the fingers from the second row of basic keys in common use to first row of basic keys in common use (i.e. from ASDFG to the ZXCVB) is much easier, this facilitates to quicken input speed as well as lighten the burden on fingers.

3. According to a conventional keyboard, the keys between two basic rows are of jigsaw-like arrangement, that meets the requirement for operating a mechanical English typewriter. As an input device for computers, however, it is not necessary to have such jigsaw-like arrangement, which may further increase the complexity of action of the fingers and hinder the memorization by beginners. Therefore, the present invention makes the keys in each of the basic rows in alignment, such an arrangement should be advantageous to increase the learnability, accuracy, and speed of blind typing input.

4. While typing on a mechanical English typewriter, it is necessary for an operator to type with large extent of actions and forceful keying action of his/her hands. But as input devices for computers, significant improvements have been made on the manufacturing technique of keyboards, only selectively minor actions and elaborate keying actions are needed to perform input tasks, large extent actions of the wrists are no more necessary. Therefore, a platform is provided at the front edge (the edge adjacent to the operator) of the keyboard according to the present invention, the wrists and a portion of the palms of the operator may rest on the hand-supported platform, and the majority of operation can be performed with minor movement and elaborate keyings of the fingers. This should be advantageous to improve the efficiency of input as well as to lighten the weariness of the operator.

The indications of the reference numerals in the drawings are as follows:

1. Computer keyboard
2. Main surface
3. Groove
4. Bottom of groove
5. Front wall of groove
6. Hinge
7. platform
8. Basic keys in common use
9. Functional keys
10. Front edge Referring to FIG. 1, a groove 3 is provided in the keyboard in the position where the rows of keys ASDFG and ZXCVB are located, the row of keys ASDFG are arranged on the bottom of the grove 3, the row of keys ZXCVB are arranged on the front wall 5 of the groove with the back of the keys towards the operator. The row of keys QWERT are arranged on the main surface 2. The numeric keys 4–6 may also be arranged on the bottom of groove 3, and the numeric keys 1–3 are arranged on the front wall of the groove. The other keys are arranged on the main surface 2.

A platform 7 is hinged to the front edge 10 of the keyboard with hinges 6 to widen the surface of the keyboard and support the wrists of the operator. The platform can be rotated by 90 degrees to nestle up against the bottom and front edge 10 of the keyboard to facilitate portability. Each of the columns of basic keys in common use and functional keys is parallel to the left and right edges of the keyboard.

Figure 2:
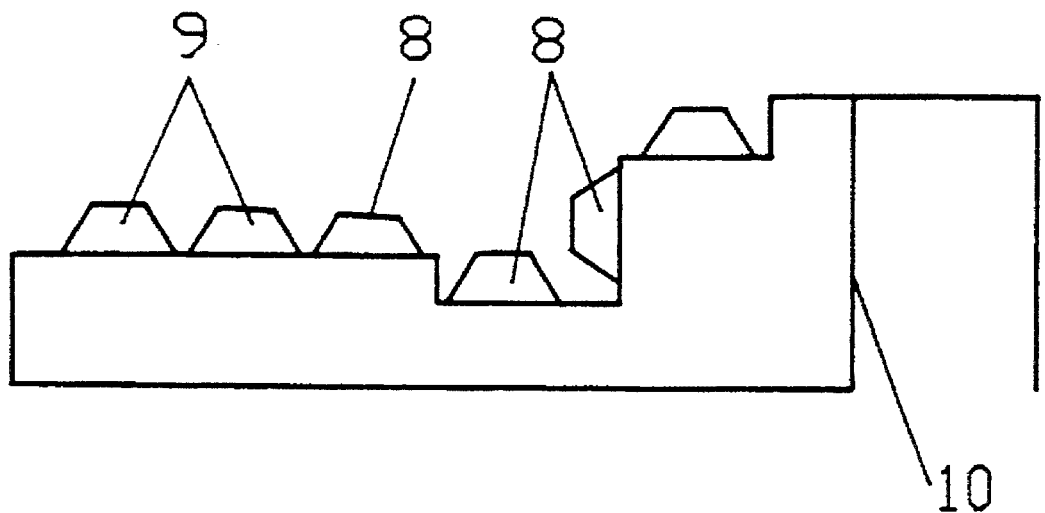
FIG. 2 is a right side elevation view of the computer keyboard.

FIG. 2 shows the relative positions of three rows of basic keys in common use.

While a groove is provided in order that the upper surfaces of ASDFG keys are lower than those of any other keys, the keys with different hight can also be used for achieving the same effect.

While the present preferred embodiment of this invention has been illustrated and described in detail, it will be understood that the modifications as to details of construction and design are possible without departing from the spirit of the invention or the scope of the following claims.

What claimed is:

1. A computer keyboard comprising a front, basic keys, functional keys, a main surface and a surface which is at an angle with the main surface;

the front being a part of the keyboard closest to an operator when the keyboard is in use;

the keys having an upper surface and a back, and being arranged in alignment in substantially parallel fixed rows;

the substantially parallel fixed rows being on the main surface and on the surface which is at an angle with the main surface, each key being in a fixed position with respect to each of the other keys;

the back of the keys being that part by which the keys are attached to the keyboard;

the surface which is at an angle with the main surface being closer to the front of the keyboard than the main surface; and the angle being such that the backs of the keys on the surface which is at an angle with the main surface are toward the front of the keyboard.

2. A computer keyboard as claimed in claim 1, wherein the row of basic keys in common use ZXCVB is distributed on a surface at about right a 90° angle with the main surface of the keyboard, the rows of basic keys in common use ASDFG and QWERT are distributed on the main surface of the keyboard with the upper surfaces of the row of keys QWERT higher than those of the keys ASDFG.

3. A computer keyboard as claimed in claim 1 which has left and right edges and wherein basic keys in common use are in columns which are parallel with the left and right edges of the keyboard.

4. A computer keyboard as claimed in claim 1, wherein a platform is hinged to the front edge of the keyboard.

5. A computer keyboard as claimed in claim 1 wherein the main surface comprises a groove having a bottom surface, a front surface and a rear surface;

the bottom surface being substantially parallel to the main surface and comprising a row of keys, and the front surface being the surface which is at an angle with the main surface and which is closest to the front of the keyboard.

6. A computer keyboard as claimed in claim 5, wherein the row of basic keys in common use ASDFG is distributed on the bottom surface of the groove in the keyboard, wherein the row of keys ZXCVB is distributed on the front wall of the groove with the back of the keys towards the front, the row of basic keys in common use QWERT is distributed on the main surface of the keyboard.

7. A computer keyboard as claimed in claim 5 wherein at least a pair of surfaces form a right angle.

8. A computer keyboard as claimed in claim 5 wherein the keys on the bottom surface and on the front surface are basic keys.

9. A computer as claimed in claim 8 wherein the functional keys are distributed on the main surface of the keyboard.

* * * * *